United States Patent [19]

Nestler et al.

[11] 4,073,972
[45] Feb. 14, 1978

[54] SURFACE PROTECTION FOR POROUS MATERIALS

[75] Inventors: Heinz Nestler, Niederkassel-Ranzel; Leo Hans Plankl, Recklinghausen, both of Germany

[73] Assignee: Dynamit Nobel Aktiengesellschaft, Cologne, Germany

[21] Appl. No.: 707,930

[22] Filed: July 22, 1976

Related U.S. Application Data

[63] Continuation of Ser. No. 354,606, April 26, 1973, abandoned.

[30] Foreign Application Priority Data

Apr. 26, 1972 Germany .............................. 2220378

[51] Int. Cl.² .......................... B05D 3/12; B05D 1/36; B05D 3/10
[52] U.S. Cl. .................................... 427/136; 427/299; 427/430 B

[58] Field of Search .................... 427/136, 299, 430 B

[56] References Cited

U.S. PATENT DOCUMENTS

| | | | |
|---|---|---|---|
| 3,048,499 | 8/1962 | Jellinek | 427/387 |
| 3,772,065 | 11/1973 | Seiler | 427/299 |
| 3,819,400 | 6/1974 | Plankl et al. | 427/387 |

*Primary Examiner*—James R. Hoffman
*Attorney, Agent, or Firm*—Burgess, Dinklage & Sprung

[57] ABSTRACT

An improvement in the waterproofing of a shaped article having a porous surface by initially subjecting said surface to a hydromechanical treatment by impinging cold or hot water or steam under pressure thereon and thereafter impregnating the same with a liquid form organo silicon compound, said improvement comprising treating the surface with a basically acting substance before or during the impregnation.

13 Claims, No Drawings

SURFACE PROTECTION FOR POROUS MATERIALS

This is a continuation, of application Ser. No. 354,606, filed Apr. 26, 1973, now abandoned.

BACKGROUND OF THE INVENTION

1. FIELD OF THE INVENTION

This invention relates to the treatment of porous materials especially porous materials that initially have had an oxidic surface. More particularly, this invention is directed to increasing the water-repellency of a masonry surface. This invention is particularly directed to increasing the water-repellency of a masonry surface which has been subjected to carbonic acid or the adverse effects of air thereupon.

2. DISCUSSION OF THE PRIOR ART

The treatment of surfaces made from a porous material to improve the surfaces water-repellency is broadly known. For instance, there is described in Ser. No. 190,684 of Oct. 19, 1971 (now U.S. Pat. No. 3,819,400), the disclosure of which is hereby incorporated by reference, that porous surfaces which have available hydroxyl groups can be treated to have their water-repellency improved by initially subjecting the surface to a hydrothermal treatment as by impinging steam thereagainst to provide a relatively clean surface. The surface is thereafter treated with a silane or siloxane which bonds to the surface to markedly increase the water-repellency thereof. In increasing the water-repellency, a complex chemical reaction takes places which involves the large number of hydroxyl groups present on the surface of the porous material. Usually these hydroxyl groups provide anchorage for the formation of X-O-Si bonds, where X is calcium, aluminum, silicon or titanium or the like.

Conditions are quite different, however, when the hydroxyl groups originally present on the surface of the material have already become chemically altered or reacted in some other way. The causes of such chemical alterations of the surface may not only be from normal aging but can also be from environmental conditions. Normal aging effects include especially the phenomenon of carbonation whereby the usually basic surface area of the porous material to be reacted reacts with the carbonic acid in the atmosphere. The effect of this reaction is that in the affected areas the more or less pronounced basicity of the material, e.g., concrete, is reduced or even destroyed. Although this natural reaction progresses slowly, depending upon the concentration of carbon dioxide in the air, it takes place whenever air has access to the material, especially carbonic acid bearing air. The consequences are undesirable alterations of the elasticity moduli of the boundary regions and of the passivation of any kind of steel that is embedded in the porous material, e.g., concrete.

By special environmental conditions are meant all those which involve gaseous, liquid or solid chemicals which act on the material and react with it chemically, thereby causing free hydroxyl groups to be bonded. Depending on the location of the material, this action can take place relatively rapidly such as, for example, when the material is exposed to combustion gases, acid mists, salt atmospheres and the like. In some cases, for example in the formation of chlorides, it is possible that the aforementioned hydromechanical treatment, especially one in which hot water or steam is used, may cleave the compounds that have formed and restore the desired free hydroxyl groups. In many cases, however, when carbonates or sulfates have formed, for example, this preliminary treatment will not permit this restoration of free hydroxyl groups. Thus, it is seen that the very cleaning operations can, in some cases, adversely affect the chemistry of the surface of the porous material to be treated, whereby there is precluded the restoration of free hydroxyl groups which should be available for the subsequent impregnation with silane.

The environmental influences described, however, not only bring it about that the hydroxyl groups needed for the reaction with the organo silicon compounds react with other substances on the surface to be treated, but also that the normally at least weakly basic environment on the surface areas important to the impregnation is neutralized. Since the effectivness of the silanes and siloxanes used to increase the water-repellency can be attributed at least in part to the fact that hydrolysis takes place in an initial reaction which is then followed by the reactions with the substrate, the shift of the pH value of the areas in question from the basic to the neutral results in a greater reduction of the rapidity of this initial part of the reaction. It is obvious that this interferes with the entire surface treatment system and retards the progress of the complex overall reaction. Hence, it has become desirable to improve the water-repellency process applied to surfaces offering an oxidic or hydroxyl containing surface, whereby the normal decrease in the basicity of the environment of the surface is effectively counteracted. Moreover, it has become desirable to improve the overall water-repellency without substantial additional costs.

SUMMARY OF THE INVENTION

In accordance with this invention there is provided an improvement in the method for achieving surface protection for porous surfaces by impregnating a surface with an organic silicon compound, which improvement resides in applying to the surface before or during the impregnation a basically acting substance. Before the impregnation, the surface may be treated by a hydromechanical procedure.

It has been found, in accordance with the present invention, that the water-repellency of a surface which would normally have a hydroxyl group can be markedly improved if, in accordance with past procedures, the surface is initially hydromechanically treated with water, preferably at elevated temperatures, followed by impregnation with an organic silicon compound, the improved water-repellency provided by applying to the surface before or during the impregnation a minor quantity of a basically acting substance. The basically acting substance, employed pursuant to the present invention, is suitably a naturally occurring substance such as limestone, calcareous marl, alumina, or products made from naturally occurring substances, such as cement. Additionally there may be employed other naturally occurring materials which contain calcium, suitably as a cation. Synthetically prepared substances, however, can also be used. These include alkali or alkaline-earth aluminates or carbonates. Other basically acting substances useful in accordance with the present invention include: alkali silicates, oxides or hydroxides of alkaline earth metals, optionally of calcium and magnesium, oxides of zinc or aluminium or hydroxides of aluminium.

The basically acting substances can be employed either alone or in admixture with the organic silicon compound, employed in the impregnation. When the basically acting substances are employed in admixture with the organic silicon compounds, they are mixed therewith prior to such time that the surface is impregnated with the organic silicon compound.

The basically acting substances pursuant to the invention generally are insoluble or sparingly soluble in water, alcohols, or other solvents generally employed to dissolve the silanes. When they are insoluble in these solvents, they may be mixed with the silanes in the form of powders or suspensions in water or alcohol or other suitable dispersants. For those basically acting substances which are soluble in alcohols or other suitable solvents, it is possible to mix them with the organic silicon compounds or to apply the solution thereof to the surface after hydrothermal treatment and then impregnate the so-pretreated surface with the silane solution.

The amount of basically acting substances that is to be used is not particularly critical. These substances are often poorly soluble in alcohol and other organic solvents, and they are only sparingly soluble in water. However, the amount of such substance that is soluble in the alcohol or organic solvent is generally enough to provide the basically acting property desired. For instance, it has been found that as little as a 0.1 wt-% solution of the basically acting substance in an impregnating solution of the organic silicon compounds provides sufficient adhesion-improving effect. No particular upper limit need be set forth for the amount of basically acting substance to be dissolved in the impregnating solution. However, it has been found that a quantity of as much as 10% of the weight of the impregnating solution can be the basically acting substance. If the treatment of the surface with a solution of the basically acting substance is performed prior to impregnation with the organic silicon compound, the amount of additive in the solution can vary between 0.1 and 10% by weight. The effect that is produced by this additive is remarkable in that even minor quantities of the basically acting substance improve the water-repellency of porous objects so treated even beyond that degree of improvement provided by the process of Ser. No. 190,684 of Oct. 19, 1971. This is in spite of the presence of a surface which is in itself not favorable to an increase in the water-repellency owing to the fact that the surface has been pretreated or subjected to the adverse effects of carbonic acid.

The improvements pursuant to the present invention are realized because there is created a sufficiently basic environment at the surface of the porous material being impregnated so as to enable a relatively rapid hydrolysis of those portions of the molecule of the effective substance which are suitable for the hydrolytic cleavage. The presence of the basically acting substance permits the realization of a better anchoring of the organic silicon compound in that the additive, which by and large is a polyvalent material, binds itself partially to the substrate through salt exchange and partially to the impregnate. Thus, the basically acting substance to some extent acts as a bridge between the molecular components of the surface and the water-repelling agent impregnated therein.

It should be stated that generally the amount of basically acting substance employed depends upon the nature of the porous material and the amount of that substance in the impregnate or pretreating solvent. It is desirable that the porous material be treated with between 0.1 and 50 grams of basically acting substance per square meter of surface area. The amount of basically acting substance which treats the porous material will therefore depend upon whether or not there is a pretreatment, the concentration of the basically acting substance in the pretreatment solvent and the concentration of the basically acting substance in the silane solution. These values for concentrations can be regulated so as to insure that between 0.1 and 50 grams of basically acting substance per square meter of porous material, are added to the surface undergoing treatment. This can also be done through the use of minute solids or slurries. Where a surface is being treated with a slurry or a solid form of the basically acting substance, it is preferred that the particle size of the basically acting substance in as fine-granular as possible. The degree of fineness depends on the material employed.

DESCRIPTION OF SPECIFIC EMBODIMENTS

As indicated above, the treatment of a porous material may be optionally done in at least two steps, the first of which consists of contacting the surface with water. Preferably a scrubbing action or the like is conducted on the surface of the material to be impregnated. The water can be cold or hot and steam can be used to facilitate the cleansing of the surface of the porous material. For instance, a steam jet can be employed utilizing superheated steam under pressure. For this purpose water can be heated and used with appropriate aggregates, such as marketed, for instance, by Malsbary Manufacturing Company of Oakland, California under the name HPC-Malsbar Aggregates. The water leaves through an appropriate nozzle in the form of superheated steam under pressure. Inside the engine system of the aggregate, the temperature of the water is at least 150° C and should be compressed by compressor to 20 atmospheres if possible. The water weight rate of flow at the inlet opening of the engine system should not be less than 1200 meters per minute, if possible. As in the case of the high pressure water process, it is also possible to additionally use sand blasting and/or surfactants.

Where the surface to be treated is contacted with cold water to prepare the same for the subsequent impregnation, the water can have a temperature up to 80° C, preferably about 60° C. It is applied under pressure which varies depending upon the surface condition of the material, such as, for example, the degree of contamination and the nature of the medium. Some surfaces are more resistant to higher temperatures and pressures than are others. If possible, the applied pressure should be more than 10 atmospheres. The pressure to be applied does not have any upper limit, save, of course, the breaking limit of the surface. Pressures up to 750 atmospheres can be used without any difficulty. The maximum pressure depends upon the load the porous material being treated can withstand without being damaged.

In the second step of the process, a provision is made for the treatment of the porous material with the basically acting substance as described above. This provision can take either of two forms or, for that matter, both forms can be employed. As a second step, one can mix the basically acting substance into a solution containing the silane to serve as the impregnant or one can apply the basically acting substance directly to the so-cleansed substrate either as such or in the form of a solution or slurry as discussed above. Thereafter, the solution of silane or siloxane is applied to the pretreated porous surface to impregnate the same.

As organo silicon compounds there can be used silanes having the general formula $R^2 - Si(OR^1)_3$, wherein $R^1$ is an alkyl, of up to 8 carbon atoms hydroxyalkyl or alkoxyalkyl radical having 1 to 4 carbon atoms in each alkyl moiety and $R^2$ is alkyl, alkenyl, aryl, cycloalkyl, cycloalkenyl, aralkyl or aralkenyl radical.

Alkyl groups according to this invention are preferably lower alkyl groups having up to about 8 carbon atoms in straight or branched chain configuration. Exemplary alkyl groups are methyl, ethyl, propyl, butyl, isopropyl, 2-ethylhexyl, n-octyl and the like.

Alkenyl groups according to this invention are preferably lower alkenyl groups having up to about 8 carbon atoms in straight or branched chain configuration with one or more cites of ethylenic unsaturation at some point in the molecule. Exemplary alkenyl groups are vinyl, allyl, crotyl, propenyl, iso-propenyl, 2-ethylhexenyl, butadienyl and the like.

Cycloalkyl groups according to this invention are preferably groups having 4 to 8 carbon atoms in the ring, such as cyclobutyl, cyclohexyl or cyclooctyl, which rings may have one or more inert substituents, e.g. alkyl groups, thereon. The substituents are preferably lower alkyl of up to about 8 carbon atoms such as methyl, ethyl, propyl, n-hexyl, n-octyl, etc., and there may be as many such substituents as there are hydrogen atoms to be replaced on the ring carbon atoms.

Cycloalkenyl groups according to this invention are in all respects similar in definition to the cycloalkyl groups set forth above except that they have one or more cites of ethylenic unsaturation in the ring. Such cycloalkenyl rings are exemplified by cyclobutenyl, cyclohexadienyl and cyclooctatetraenyl. The number of possible alkyl substituents on the ring is again equal to the number of replaceable hydrogen atoms on the ring carbon atoms.

Aryl groups according to this invention are mono, di or tricyclic, preferably monocyclic. They are exemplified by phenyl, naphthyl, diphenyl, phenyl methyl phenyl groups and the like. The rings may be fused or unfused and may have one or more inert substituents thereon such as alkyl groups, particularly lower alkyl groups of up to 8 carbon atoms such as methyl, ethyl, propyl, 2-ethyl hexyl, etc.

The aryl portion of the aralkyl and aralkenyl substituent groups are as defined above. The alkyl and alkenyl portions of these groups are likewise as defined above.

Alkoxy groups and hydroxyalkyl groups according to this invention generally conform, at least insofar as the alkyl portion thereof is concerned, to the definition of alkyl groups as set forth above.

Examples of the aforementioned silanes are ethyl-, butyl, or hexyl-trimethoxysilane, methyl-, ethyl-, propyl- or butyl-tris-(2-methoxy-ethoxy)-silane, tris-(2-ethoxy-ethoxy)-silane, phenyltriethoxysilane and cresyltriethoxysilane.

The preparation of these silanes is accomplished by generally known methods.

The silanes are preferably used either as aqueous, or a liquid hydrocarbon solutions or dissolved in a $C_2-C_4$ alkanol. Aqueous alcoholic solutions may also be employed. The impregnation with these silanes takes place according to the process of Ser. No. 153,115 of June 14th, 1971, now U.S. Pat. No. 3,772,065.

The quantity of silane compounds to be applied to the pretreated surface depends to a great extent upon the specific structure of the substrate and upon the degree of hydrophobicity desired. Good results are obtained when using quantities as low as 200 g/m² of a 10% by weight silane or siloxane treating solution. But the solutions of the organosilicon compounds may also be more concentrated or more diluted. It is of advantage to use 5 to 40% by weight solutions. If the impregnating solution is repeatedly applied, each solution used may have less than 5% by weight silicon organic compounds.

As indicated above, the present invention is particularly useful in the treatment of porous materials which have inorganic oxidic surfaces, especially those which have been subjected to carbonic acid. Inorganic oxidic materials impregnated in accordance with the present invention, i.e. treated with the basically acting substance to improve the water-repellency, are those which generally contain or had contained a free available hydroxyl group to which an Si-O-bond can be linked. The materials include cement and/or lime, in particular exterior plaster finishes of facade walls or concrete surfaces of roads and runways. Materials from aluminum oxide and titanium dioxide or mixtures of these oxides with silicate-containing materials as contained in masonry, bricks, roofing tiles, natural and artificial stones and macadam, which have a certain capillary structure and, therefore, are absorbent can also be treated.

In order to more fully illustrate the nature of the invention and the manner of practicing the same, the following examples are presented:

EXAMPLE 1

Three concrete slabs (size 10 × 10 × 2 cm) of quality class B 350 (determined according to DIN 1045 alt) were tested, which had been greatly carbonated by long exposure to the air. The application of a phenolphthalein solution (1% sol. in alcohol) resulted in virtually no red coloration, not even in the presence of water. For control, a layer about 1 mm thick was scratched away from a small area, and a drop of phenolphthalein solution applied thereto resulted immediately in an intense red coloration.

Slab 1 remained untreated.

Slab 2 was first subjected to a high-pressure hot water treatment and then was dipped twice for 10 seconds at intervals of about 10 minutes into a 40% solution of butyltrimethoxysilane in ethyl alcohol. After this treatment the plate was thoroughly impregnated with the solution of the effective substance.

Slab 3 was treated the same as Slab 2, except that approximately 1 wt-% of $Ca(OH)_2$ was added in powder form to the effective substance solution; the solution therefore appeared slightly turbid over a sediment of $Ca(OH)_2$. The treated slab after drying differs scarcely at all from Slab 2.

After two weeks of letting the slabs stand at room temperature and 50% relative humidity the acid test was applied to the surfaces of the slabs (application of one or more drops of an approximately 2% solution of acid such as hydrochloric acid, sulfuric acid, a mixture of zinc chloride and phosphoric acid, etc.); where carbonates are present due to the reaction of the slab with the carbon dioxide content of the air a plainly perceptible gassing occurs.

The results were as follows:

Slab 1: Acid spreads out and penetrates immediately with strong gassing ($CO_2$).

Slab 2: Drop stands on the repellentized surface; after about 30 seconds a slight gassing can be detected.

Slab 3: Drop stands on the surface; no gassing for 60 seconds.

EXAMPLE 2

Concrete blocks (quality class B 300 according to DIN 1045 alt) which had been heavily carbonated by long exposure to a $CO_2$ atmosphere were studied to see the effect of various treatments on the penetration of water when the blocks are treated and then let stand for 10 days under a water column 10 cm high. The blocks were subjected to the following pretreatment:

I No impregnation.

II Impregnated with 40% solution of butyltrimethoxysilane in alcohol (same as Example 1, Slab 2).

III Impregnated same as II with addition of 2% Ca-$(OH)_2$ (same as Example 1, Slab 3).

IV Impregnated same as III except that instead of $Ca(OH)_2$ 2% sodium aluminate was added in the form of a 10% aqueous solution.

a. The weight of the blocks was about 600 g. The following is a list of the amounts of water absorbed after 10 days standing in water, expressed as a percentage of the dry weight:

Slab I + 2.22%
Slab II + 1.04%
Slab III + 0.60%
Slab IV + 0.77% b. After the blocks had returned to their original dry weight after exposure to air for about 14 days, the 10-day water immersion test was repeated as described under (a). The following amounts of water were absorbed:

Slab I + 1.96%
Slab II + 1.36%
Slab III + 0.90%
Slab IV + 0.97%

EXAMPLE 3 a. Since the severe exposure to water in Example 2 is far in excess of that against which repellentizing is normally expected to give protection, the procedure of Example 2 was repeated except that the blocks were placed under a 10 cm water column for a period of only 24 hours. The water absorption after this period was as follows for the individual slabs:

Slab I + 1.33%
Slab II + 0.42%
Slab III + 0.31%
Slab IV + 0.34% b. After the second water immersion test performed in the same manner as in Example 2b, the following weight increases were determined after one day's time:

Slab I + 1.26%
Slab II + 0.46%
Slab III + 0.33%
Slab IV + 0.31%

From the above information it is clearly apparent that the good effect produced by the silane treatment (II) in comparison to the untreated substrate (I) is appreciably further enhanced by additives of the kind claimed in accordance with the invention (III, IV).

What is claimed is:

1. In a process for improving the water-repellancy of a porous surface of an object normally having an inorganic oxidic or hydroxyl containing surface which surface is neutral or acidic to phenolphthalein in which the surface is impregnated with a solution consisting essentially of an alkyltrialkoxysilane wherein the alkyl group has 1 to 6 carbon atoms and the alkoxy group has 1 to 8 carbon atoms dissolved in a $C_2$-$C_4$ alkanol, the improvement which comprises contacting the porous surface with a basic substance selected from the group consisting of limestone, calcareous marl, an alkali metal carbonate, an alkaline earth metal carbonate, alkali silicates, oxides of alkaline earth metals, hydroxides of alkaline earth metals, oxides of zinc, hydroxides of aluminum and sodium aluminate in the form of a 0.1 to 10% by weight solution or slurry before or during the impregnation, the basic substance being applied to the neutral or acidic to phenolphthalein surface in an amount between 0.5 and 50 gms/m².

2. An improvement according to claim 1 wherein the surface is contacted with the basic substance before impregnation.

3. An improvement according to claim 1 wherein the surface is contacted with the basic substance during impregnation.

4. An improvement according to claim 3 wherein the organic silicon compound is present in the form of a solution in which the basic substance is present.

5. An improvement according to claim 1 wherein the basic substance is selected from the group consisting of limestone, calcareous marl, alumina, and alkali or alkaline-earth aluminates.

6. A process according to claim 1 wherein said basic substance is calcium hydroxide.

7. A process according to claim 1 wherein said basic substance is sodium aluminate.

8. A process according to claim 1 wherein said inorganic oxidic or hydroxyl containing surface is the exterior plaster finish of a facade wall or a concrete roadway.

9. A process according to claim 1 wherein said porous surface is a surface of masonry, brick, roofing tile, stone or macadam.

10. A process according to claim 1 wherein the organic silicon compound is a liquid silane of the formula $R^2$—Si—$(OR^1)_3$ wherein $R^1$ is a member selected from the group consisting of alkyl of 1 to 8 carbon atoms, hydroxyalkyl of 1 to 8 carbon atoms and alkoxyalkyl of 1 to 4 carbon atoms in each of the alkyl and alkoxy portions thereof; and $R^2$ is an alkyl group of up to 8 carbon atoms.

11. In a process for improving the water-repellancy of a porous surface of an object normally having an inorganic oxidic or hydroxy group, which surface is neutral or acidic to phenolphthalein in which the surface is initially subjected to a mechanical treatment with water and thereafter impregnated with a mixture consisting essentially of an alkyltrialkoxysilane whose alkyl group is $C_1$-$C_6$ and whose alkoxy group is $C_1$-$C_8$ dissolved in a $C_2$-$C_4$ alkanol solvent, the improvement which comprises contacting the porous surface with a basic substance selected from the group consisting of alkali silicates, hydroxides of alkaline earth metals, oxides of zinc, oxides of aluminum, hydroxides of aluminum and sodium aluminate in a 0.1 to 10 weight percent solution or slurry before or during the impregnation, the substance being applied to the neutral or acidic to phenolphthalein surface in an amount between 0.5 and 50 gms/m².

12. In a process for improving the water-repellancy of a porous surface of an object normally having an inorganic acidic or hydroxyl containing surface, which surface is neutral or acidic to phenolphthalein in which the surface is impregnated with a mixture consisting essentially of an alkyltrialkoxysilane wherein the alkyl group has 1 to 6 carbon atoms and the alkoxy group has 1 to 8 carbon atoms dissolved in a liquid hydrocarbon, the improvement which comprises contacting the porous surface with a basic substance selected from the group consisting of limestone, calcareous marl, an alkali metal carbonate, an alkaline earth metal carbonate, alkali silicates, oxides of alkaline earth metals, hydroxides of alkaline earth metals, oxides of zinc, oxides of aluminum, hydroxides of aluminum and sodium aluminate in the form of a 0.1 to 10% by weight solution or slurry before or during the impregnation, the basic substance being applied to the neutral or acidic to phenolphthalein surface in an amount between 0.5 and 50 gms/m².

13. In a process for improving the water repellancy of a porous surface of an object normally having an inorganic oxidic or hydroxyl group, which surface is neutral or acidic to phenolphthalein in which the surface is initially subjected to a mechanical treatment with water and thereafter impregnated with a mixture consisting essentially of an alkyltrialkoxysilane whose alkyl group is $C_1$-$C_6$ and whose alkoxy group is $C_1$-$C_8$ dissolved in a liquid hydrocarbon solvent, the improvement which comprises contacting the porous surface with a basic substance selected from the group consisting of alkali silicates, hydroxides of alkaline earth metals, oxides of zinc, oxides of aluminum, hydroxides of aluminum and sodium aluminate in a 0.1 to 10 weight percent solution or slurry before or during impregnation, the basic substance being applied to the neutral or acidic to phenolphthalein surface in an amount between 0.5 and 50 gms/m².

* * * * *